Oct. 31, 1967        J. H. HYNES        3,350,104
SEAL RING RETAINING APPARATUS
Filed Sept. 21, 1965        2 Sheets-Sheet 1
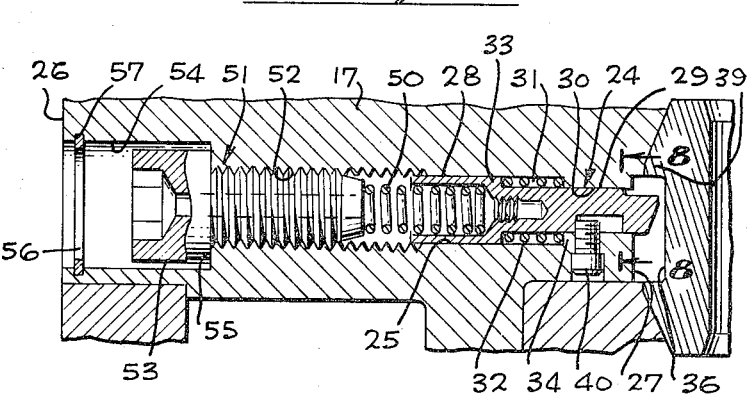
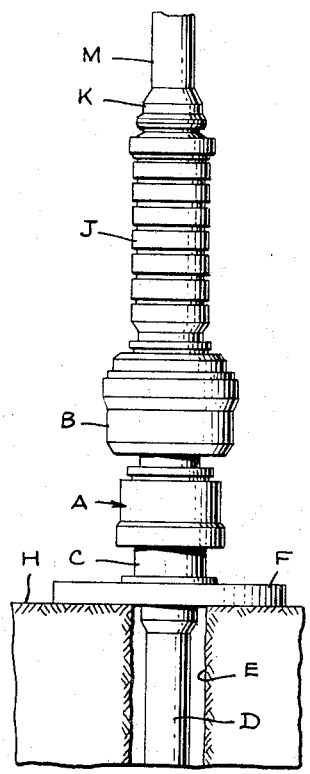
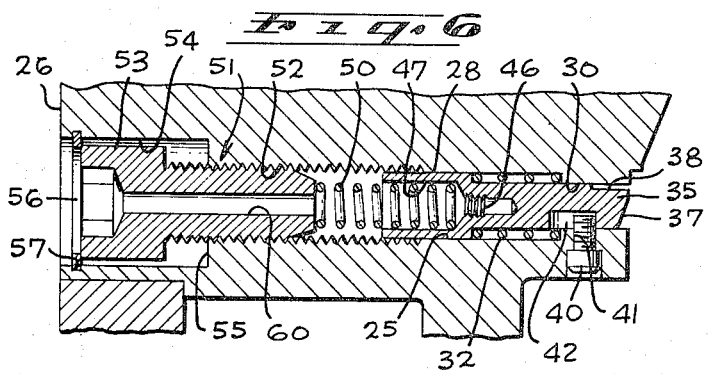
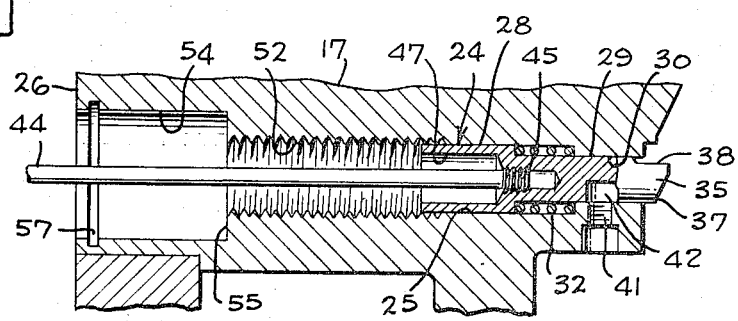
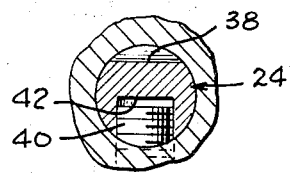
INVENTOR.
JOSEPH H. HYNES
BY
Bernard Kiegel
ATTORNEY

JOSEPH H. HYNES
INVENTOR.

BY Bernard Kriegel
ATTORNEY

United States Patent Office 3,350,104
Patented Oct. 31, 1967

3,350,104
SEAL RING RETAINING APPARATUS
Joseph H. Hynes, Ventura, Calif., assignor to Ventura Tool Company, Ventura, Calif., a corporation of California
Filed Sept. 21, 1965, Ser. No. 488,878
12 Claims. (Cl. 277—9)

The present invention relates to well equipment, and more particularly to connector or coupling apparatus for releasably securing various well components to one another, as at the location of a well head.

In the drilling of oil and gas wells at an underwater site, a coupling is used for connecting components to one another in sealed or pressure tight relation. It is usual for the upper portion of the coupling to contain a seal ring retained in place by a suitable device, this seal ring being brought into sealing relation with a lower portion of the coupling previously installed at the underwater location. At times, the upper portion of the coupling and the seal ring are elevated to the drilling rig, which allows the seal ring to be inspected and, if required, replaced.

Heretofore, difficulty has been encountered in installing, removing and reinstalling seal rings in their associated coupling members, requiring considerable time and entailing great expense at an offshore location because of the large cost of offshore operations. In addition, damage to the seal ring and to their sealing surfaces oftentimes occurs.

Accordingly, it is an object of the present invention to provide an improved device for retaining a seal ring, and the like, in a coupling member, that enables the seal ring to be easily assembled in the coupling member and to be removed therefrom without difficulty.

Another object of the invention is to provide a device for retaining a seal ring, and the like, in a coupling member in which assembly of the retention device with respect to the seal ring and its disassembly therefrom can be accomplished without damage to the seal ring, and particularly to its sealing surfaces.

A further object of the invention is to provide a device for releasably retaining a seal ring, and the like, in a coupling member, in which assurance is had that the seal ring is positively connected to the coupling member, and in which the retention device can be positively released from the seal ring.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a diagrammatic view of well bore drilling equipment at an underwater well site, including a connector embodying the invention;

FIG. 5 is an enlarged section through one of the retention devices, disclosed in a position holding the seal ring in place;

FIG. 6 is a view similar to FIG. 5, showing the retention device in released position;

FIG. 7 is a view similar to FIG. 5, showing the manner of assembling part of the retention device, or of forcibly releasing it from the seal ring;

FIG. 8 is an enlarged section taken along the line 8—8 on FIG. 5.

Figure 2:
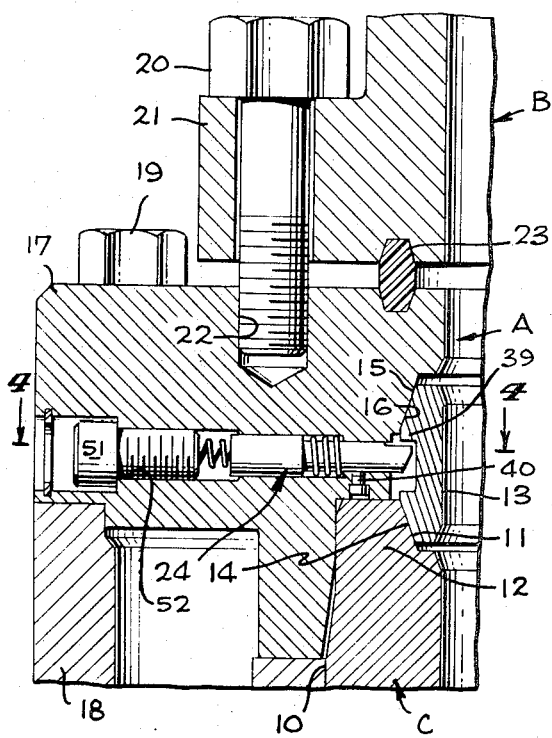
FIG. 2 is a vertical section through a portion of the connector or coupling disclosed in FIG. 1, with the seal ring in place and sealed against a companion member, such as a well head.
Figure 3:
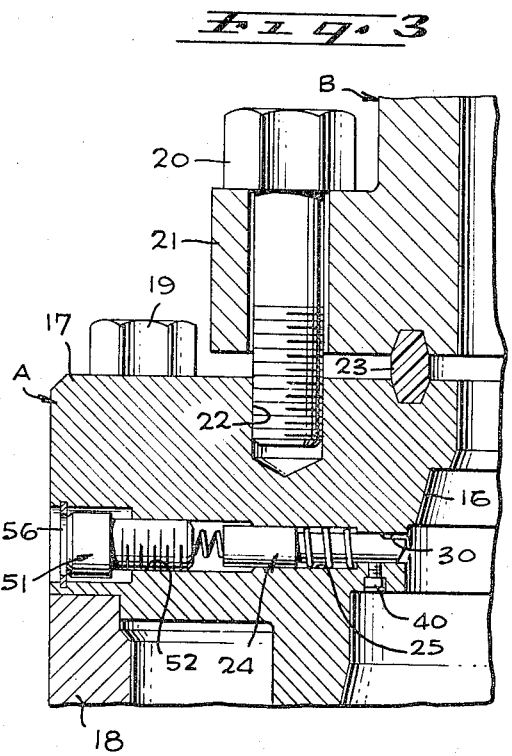
FIG. 3 is a view similar to FIG. 2 illustrating the upper coupling member with the seal ring removed therefrom.
Figure 4:
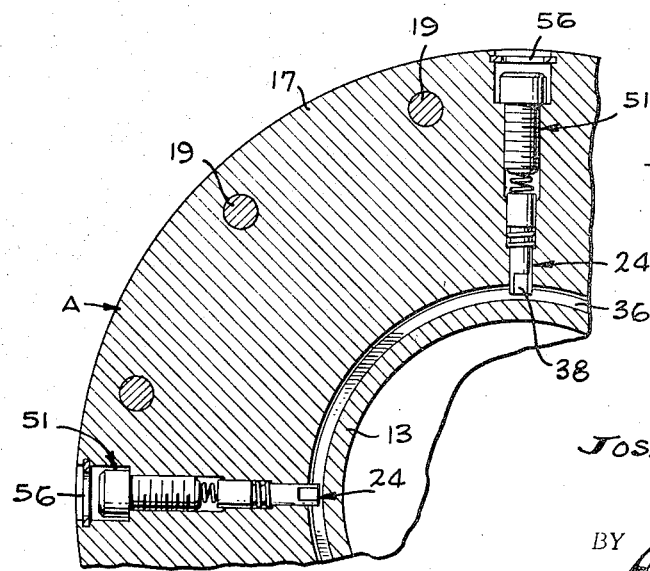
FIG. 4 is a section taken along the line 4—4 on FIG. 2.

The invention is illustrated in the drawings as being applied to a fluid or hydraulically operated connector or coupling apparatus A for connecting a blowout preventer B to a well head C forming the upper portion of a foundation pile D disposed and secured within a well bore E, and attached to a suitable pad F resting upon the bottom or floor H of an ocean. The blowout preventer B is secured through a flexible joint J and a connector K to a marine conductor pipe M extending upwardly to a drilling vessel or barge (not shown) floating in the ocean or other body of water. The barge carries the usual equipment for drilling the well bore. The hydraulic connector A, blowout preventer B, flexible joint J, connector K and marine conductor pipe M are lowered through the body of water to the well head C for the purpose of effecting an attachment of the hydraulic connector thereto, in the manner specifically described in the application of Arthur G. Ahlstone, Ser. No. 476,417, filed Aug. 2, 1965, for "Coupling Apparatus for Well Heads and the Like."

The tubular foundation pile D of any suitable length is secured within the well bore E, the casing head C extending above the pad F resting upon the bottom H of the ocean. The well head C has an outer surface 10 of a suitable shape and a downwardly tapering internal sealing face 11 at its upper terminal 12. A seal ring 13 has a lower external tapered face 14 adapted to mate against the internal sealing face 11 of the well head and it also has an upper external tapered face 15 adapted to seal against a companion tapered surface 16 in the upper portion of an adapter 17 forming part of the connector apparatus A. This adapter is secured to the main body portion 18 of the connector apparatus by a plurality of screws 19, and, as illustrated in FIG. 2, fits over the well head C, the adapter 17 and the main body 18 being secured to the well head in the manner described in detail in the above-identified patent application, which will bring the tapered upper and lower internal sealing surfaces 15, 11 of the adapter 17 and the well head C into firm leakproof sealing engagement with the companion upper and lower tapered surfaces 15, 14 on the seal ring 13.

As disclosed in the drawings, the adapter 17 is secured to the lower end of the blowout preventer B by screws or studs 20 extending through a lower flange 21 of the blowout preventer and threaded into bores 22 of the adapter, a gasket 23 being clamped between the blowout preventer and adapter to prevent leakage therebetween.

The seal ring 13 is retained within the adapter 17, as during lowering or elevating of the coupling device A toward or from the well head C, by a plurality of circumferentially spaced retaining plungers or plugs 24 slidable in radial passages 25 in the adapter extending from its outer surface 26 to its inner surface 27 at the location of the seal ring 13. Each plunger is of a stepped configuration, including an outer relatively large diameter portion 28 slidable in the bore 25 and an inner smaller diameter portion 29 slidable in a companion smaller diameter portion 30 of the bore 25. The smaller diameter portion 29 provides an annular space 31 with the wall of the bore 25 in which a helical compression spring 32 is contained that bears against a shoulder 33 on the plunger and a shoulder 34 on the adapter, the compression spring tending to expand and shift the plunger 24 in a radial outward direction and thereby move its inner nose portion 35 out of a peripheral central groove 36 in the seal ring or gasket 13. The inner nose portion 35 has a tapered cam surface 37 which inclines in a downward and outward direction, and it also has a flat upper surface 38 adapted to engage the upper side or shoulder 39 of the seal ring groove 36.

Each plunger 24 is retained in oriented position, and its movement in the bore 25 is limited, by an orienting and limit screw 40 threaded upwardly in a transverse passage 41 in the adapter 17 and which extends into a groove 42 in the lower side of the plunger. The screw 40 is engageable with the opposite ends of the groove 42 to limit the extent of radial inward and outward movement of the plunger 24 in its companion bore 25, and is also engageable with the sides of the groove 42 to prevent turning or rotation of the plunger in its bore, thereby retaining its flat surface 38 in its upwardly facing position and its tapered or cam surface 37 inclined in an appropriate downward and outward direction.

Each plunger 24 can be installed in its companion bore 25 through the aid of an installation and release rod 44 having an inner threaded end 45 adapted to be threadedly received in a companion threaded bore 46 in the plunger that opens into an enlarged bore or spring socket 47 in the enlarged diameter portion 28 of the plunger. The rod 44 is threadedly secured to the plunger 24 and it can then insert the plunger from the exterior of the adapter into the radial bore 25 to its inner portion, with the spring 32 having first been placed around the reduced diameter portion 29 of the plunger or plug. When disposed in the innermost portion of the adapter passage 25, the rod 44 and plunger 24 are turned to align the groove 42 with the transverse hole 41 in the adapter, whereupon the screw 40 can be threaded upwardly into such hole to a position in which its inner portion extends into the groove 42. The rod 44 can then be rotated and unthreaded from the plunger 24 and removed from the adapter passage 25.

Each helical compression spring 32 tends to shift its plunger 24 outwardly to a position in which its nose 35 will be fully removed from the peripheral groove 36 of the seal ring 13. Each plunger is urged in an inward direction by a helical compression spring 50 disposed in the bore 25 and within the socket 47, the inner end of the spring engaging the base of the socket and its outer end engaging a spring seat or spring energizer 51 in the form of a screw threaded within a threaded portion 52 of the radial adapter bore 25. The screw has an outer head 53 disposed within a counterbore 54 of the passage 25 extending to the outer surface 26 of the adapter, the screw being adapted to be threaded inwardly to its fullest extent, determined by engagement of its head 53 with the base 55 of the counterbore, at which the plug or plunger actuating spring 50 will be compressed or energized to an extent overcoming the force of the retracting spring 32, and will thereby yieldably urge the plunger 24 inwardly to a position in which it can extend into the peripheral groove 36 of the seal ring. Rotation of the screw 51 to feed it in a direction outwardly of the bore 25 to an extent at which its head 53 engages a stop ring 56 will relieve the compressive force on the plug actuating spring 50, and may, in fact, move the screw 51 out of engagement with the spring, which will allow the retracting spring 32 to expand and shift the plug or plunger 24 in a radial outward direction to remove its nose 35 from the peripheral groove 36 of the seal ring. The stop ring 56 is in the form of a split snap ring located in a groove 57 extending outwardly from the counterbore 54, the ring overlying the screw head 53.

The retracting spring 32 shifts its associated plunger in an outward direction when the spring energizing screw 51 is threaded outwardly into engagement with the snap ring 56 to retract the plunger 24 from the peripheral groove 36; whereas, full threading of the screw 51 inwardly within the bore 25 will compress the plug actuating spring 50 to an extent sufficient to overcome and compress the retracting spring 32 and shift the plunger 24 inwardly of the adapter 17 to the extent limited by engagement of the plunger with the orienting and limit screw 40 to yieldably hold the plunger or plug in its inward position. Despite its inward location, each plunger can still be forced in an outward direction within the radial bore 25 against the compressive force of the actuating spring 50.

When the seal ring 13 is to be installed within the upper coupling member or adapter 17 on the drilling rig, it is placed in a ring groove of a lower portion of a coupling (not shown), which serves as a test stand, and which may be of the same shape and structure as the upper portion 12 of the well head C. The radial screws 51 are threaded inwardly to their fullest extent in which their heads 53 engage the bottoms 55 of the counterbores, which will energize the actuating springs 50 and cause them to shift the plungers 24 inwardly, and compress the retracting springs 32, to the extent at which the nose portions 35 of the plungers project inwardly of the inner surface 27 of the adapter, as determined by their engagement with the limit screws 40. The upper coupling member A with the plungers 24 in their inward position is then lowered over the seal ring 13 on the test stand, the ring engaging the tapered surfaces 37 on the nose portions 35 of the plungers and camming the plungers outwardly, the upper coupling member A and its plungers 24 then moving downwardly over the seal ring 13 until the plungers are opposite its peripheral groove 36, whereupon the actuating springs 50 will snap the plungers back in an inward direction into the peripheral groove 36 of the seal ring, in which their upper flat surfaces 38 are disposed under the upper shoulder or side 39 of the peripheral groove, for the purpose of holding the seal ring 13 in place.

If desired, the radial screws 51 may be threaded fully outwardly until they engage their snap rings 56, which will allow the retracting springs 32 to shift the plungers 24 to their relative outward positions within the radial bores 25. The upper coupling device A, with the plungers retracted, is then placed over the seal ring 13 disposed on the test stand coupling member (not shown), until the plunger noses 35 are opposite the peripheral groove 36, whereupon the screws 51 are threaded inwardly to their fullest extent to compress the helical springs 50 and cause them to shift the plungers 24 inwardly into the seal ring groove 36 and under its upper side or shoulder 39 against the compressive force of the retracting springs 32, in which additional retracting spring energy has been stored.

The coupling apparatus A can then be secured to the blowout preventer B, the latter being attached to the flexible joint J, connector K and marine conductor pipe M. This assembly is lowered from the barge (not shown) toward the well head C until the adapter 17 and main body 18 move over the well head and are firmly coupled thereto, the seal ring 13 sealing against the tapered internal sealing face 11 of the well head C and also against the tapered surface 16 of the adapter or upper connector member 17.

In the event the coupling A is released from the well head C, it is elevated to the drilling barge or rig. The seal ring 13 can be removed by unthreading the radial screws or spring seats 51 to their fullest extent to relieve the compression in the springs 50, allowing the retracting springs 32 to expand and shift the plungers 24 out of the external groove 36 in the seal ring, which will enable the seal ring to drop out of the adapter or upper coupling member 17. The seal ring 13 can then be inspected and replaced, if desired, or a new seal ring substituted in its place and assembled to the adapter 17 in the manner described above.

If, for some reason, a retracting spring 32 fails to retract a plunger 24 fully from the peripheral groove 36 of the seal ring, an installation and release rod 44 can be inserted through a central passage 60 in the screw 51 and through the actuating spring 50, and threaded into the bore 46 of the plunger, thereby connecting the rod thereto. A required outward pull can then be taken on the rod 44, which will effect a positive pulling of the plunger 24 in a direction radially outwardly of the ring 13 and completely from the groove 36, thereby allowing removal of the seal ring from the adapter 17.

I claim:

1. In a coupling device: a coupling member having a sealing surface; a seal ring having a surface adapted to seal against said sealing surface; means for supporting said seal ring on said coupling member comprising a plurality of circumferentially spaced plungers on said coupling member shiftable laterally to and from engagement with said seal ring, spring means engageable with said plungers, and means on said coupling member for energizing said spring means to cause said spring means to yieldably hold said plunger in engagement with said seal ring to support said seal ring on said coupling member, said energizing means being movable on said coupling member to a position deenergizing said spring means to allow said plungers to shift from engagement with said seal ring and permit removal of said seal ring from said coupling member.

2. In a coupling device: a coupling member having a sealing surface; a seal ring having a surface adapted to seal against said sealing surface; means for supporting said seal ring on said coupling member comprising a plurality of circumferentially spaced plungers on said coupling member shiftable laterally to and from engagement with said seal ring, first spring means engageable with said plungers and tending to shift said plungers from engagement with said ring, second spring means engageable with said plungers, and means on said coupling member for energizing said second spring means to cause said second spring means to yieldably hold said plungers in engagement with said seal ring against the force of said first spring means and thereby support said seal ring on said coupling member, said energizing means being movable on said coupling member to a position deenergizing said second spring means and allowing said first spring means to shift said plungers from engagement with said seal ring to permit removal of said seal ring from said coupling member.

3. In a coupling device: a coupling member having a sealing surface; a seal ring having a surface adapted to seal against said sealing surface; means for supporting said seal ring on said coupling member comprising a plurality of circumferentially spaced plungers on said coupling member shiftable laterally to and from engagement with said seal ring, spring means engageable with said plungers, and means on said coupling member for energizing said spring means to cause said spring means to yieldably hold said plungers in engagement with said seal ring to support said seal ring on said coupling member, said energizing means being movable on said coupling member to a position deenergizing said spring means to allow said plungers to shift from engagement with said seal ring and permit removal of said seal ring from said coupling member, said plungers having tapered cam surfaces engageable by said seal ring to shift said plungers in a direction away from said seal ring against the force of said spring means.

4. In a coupling device: a coupling member having a sealing surface; a seal ring having a surface adapted to seal against said sealing surface; means for supporting said seal ring on said coupling member comprising a plurality of circumferentially spaced plungers on said coupling members shiftable laterally to and from engagement with said seal ring, spring means engageable with said plungers, and means on said coupling member for energizing said spring means to cause said spring means to yieldably hold said plungers in engagement with said seal ring to support said seal ring on said coupling member, said energizing means being movable on said coupling member to a position deenergizing said spring means to allow said plungers to shift from engagement with said seal ring and permit removal of said seal ring from said coupling member, said plungers having tapered cam surfaces engageable by said seal ring to shift said plungers in a direction away from said seal ring against the force of said spring means, and means for preventing turning of said plungers with respect to said coupling member to orient said cam surfaces in a predetermined direction.

5. In a coupling device: a coupling member having a sealing surface; a seal ring having a surface adapted to seal against said sealing surface; means for supporting said seal ring on said coupling member comprising a plurality of circumferentially spaced plungers on said coupling member shiftable laterally to and from engagement with said seal ring, spring means engageable with said plungers, and means on said coupling member for energizing said spring means to cause said spring means to yieldably hold said plungers in engagement with said seal ring to support said seal ring on said coupling member, said energizing means being movable on said coupling member to a position deenergizing said spring means to allow said plungers to shift from engagement with said seal ring and permit removal of said seal ring from said coupling member, each of said plungers having a bore therein, and a rod adapted for reception in said bore and attachment to said plunger to shift said plunger in said coupling member.

6. In a coupling device: a coupling member having a sealing surface; a seal ring having a surface adapted to seal against said sealing surface, said seal ring also having a peripheral groove; means for supporting said seal ring on said coupling member comprising a plurality of circumferentially spaced plungers on said coupling member shiftable laterally inwardly into said groove, spring means engageable with said plungers, and means on said coupling member for energizing said spring means to cause said spring means to yieldably hold said plungers inwardly in said groove to support said seal ring on said coupling member, said energizing means being movable on said coupling member to a position deenergizing said spring means to allow said plungers to shift outwardly from said groove and permit removal of said seal ring from said coupling member.

7. In a coupling device: a coupling member having a sealing surface; a seal ring having a surface adapted to seal against said sealing surface, said seal ring also having a peripheral groove; means for supporting said seal ring on said coupling member comprising a plurality of circumferentially spaced plungers on said coupling member shiftable laterally inwardly into said groove, first spring means engageable with said plungers and tending to shift said plungers laterally outwardly from said groove, second spring means engageable with said plungers, and means on said coupling member for energizing said second spring means to cause said second spring means to yieldably hold said plungers inwardly in said groove against the force of said first spring means and thereby cause said plungers to support said seal ring on said coupling member, said energizing means being movable on said coupling member to a position deenergizing said second spring means and allowing said first spring means to shift said plunngers outwardly from said groove to permit removal of said seal ring from said coupling member.

8. In a coupling device: a coupling member having a sealing surface; a seal ring having a surface adapted to seal against said sealing surface; means for supporting said seal ring on said coupling member comprising a plurality of circumferentially spaced plungers on said coupling member shiftable laterally to and from engagement with said seal ring, a helical spring engageable with each of said plungers, and screws threaded in said coupling member, each of said screws being engageable with a spring, each screw being rotatable on said coupling member to compress said spring and yieldably hold its associated plunger in engagement with said seal ring to support said seal ring on said coupling member, said screws being rotatable on said coupling member to a position deenergizing said springs to allow said plungers to shift from engagement with said seal ring and permit removal of said seal ring from said coupling member.

9. In a coupling device: a coupling member having a sealing surface; a seal ring having a surface adapted to seal against said sealing surface; means for supporting said seal ring on said coupling member comprising a plurality of circumferentially spaced plungers on said coupling member shiftable laterally to and from engagement with said seal ring, first helical compression spring engageable with said plungers and tending to shift said plungers from engagement with said seal ring, second helical compression spring engageable with said plungers, and screws threaded in said coupling member and engageable with said second springs, each of said screws being rotatable on said coupling member to compress its associated second spring, whereby said second springs yieldably hold said plungers in engagement with said seal ring against the force of said first springs and thereby support said seal ring on said coupling member, said screws being rotatable on said coupling member to a position deenergizing said second springs to allow said first springs to shift said plungers from engagement with said seal ring to permit removal of said seal ring from said coupling member.

10. In a coupling device: a coupling member having a sealing surface; a seal ring having a surface adapted to seal aganist said sealing surface, said seal ring also having a peripheral groove; means for supporting said seal ring on said coupling member comprising a plurality of circumferentially spaced plungers on said coupling member shiftable laterally into and out of said groove, helical springs engageable with said plungers, and screws threaded in said coupling member, each screw engaging a spring, rotation of a screw in one direction on said coupling member compressing its associated spring, whereby said springs yieldably hold said plungers in said groove to support said seal ring on said coupling member, each of said screws being rotatable on said coupling member to a position deenergizing its associated spring to allow said plunger to shift outwardly from said groove and permit removal of said seal ring from said coupling member.

11. In a coupling device: a coupling member having a sealing surface; a seal ring having a surface adapted to seal against said sealing surface, said seal ring also having a peripheral groove; means for supporting said seal ring on said coupling member comprising a plurality of circumferentially spaced plungers on said coupling member shiftable laterally into and out of said groove, first helical springs engageable with said plungers and tending to shift said plungers laterally outwardly from said groove, second helical springs engageable with said plungers, and a screw threaded in said coupling member and engageable with each of said second springs, said screw being rotatable on said coupling member to compress its associated second spring to cause said second spring to yieldably hold its associated plunger in said groove against the force of a first spring that engages such associated plunger and thereby support said seal ring on said coupling member, said screws being rotatable in said coupling member to a position deenergizing said second springs to allow said first springs to shift said plungers from said groove to permit removal of said seal ring from said coupling member.

12. In a coupling device: a coupling member having a sealing surface; a seal ring having a surface adapted to seal against said sealing surface, said seal ring also having a peripheral groove; said coupling member having a plurality of circumferentially spaced radial bores; means for supporting said seal ring on said coupling member comprising a plunger in each of said radial bores shiftable laterally inwardly into said groove and laterally out of said groove, a first helical compression spring in each of said bores engaging said plunger therein to shift said plunger laterally outwardly from said groove, a second helical compression spring in said bore engaging said plunger, and a screw threaded in each of said bores, each screw engaging an associated second spring and being threaded inwardly of said bore to compress said second spring and cause said second spring to yieldably hold its associated plunger in said groove against the force of its associated first spring, whereby said plungers support said seal ring on said coupling member, said screws being threaded relatively outwardly in said bores to a position deenergizing said second springs to allow said first springs to shift said plungers outwardly from said seal ring groove to permit removal of said seal ring from said coupling member, the inner ends of said plungers being tapered and engageable by said seal ring when being assembled in said coupling member to be cammed in an outward direction in said bores by said seal ring, each of said plungers having a groove and means on said coupling member extending into said groove to prevent turning of said plunger in its bore to orient said tapered surfaces in a predetermined direction.

References Cited

UNITED STATES PATENTS

| | | | |
|---|---|---|---|
| 645,224 | 3/1900 | Boehling | 277—149 |
| 969,207 | 9/1910 | Short | 277—9 |
| 2,257,213 | 9/1941 | Wolfrom | 277—171 X |
| 3,297,244 | 1/1967 | Hanes | 285—141 |

SAMUEL ROTHBERG, *Primary Examiner.*